(No Model.)
G. E. MEDLEY.
FISHING REEL.
No. 346,490. Patented Aug. 3, 1886.
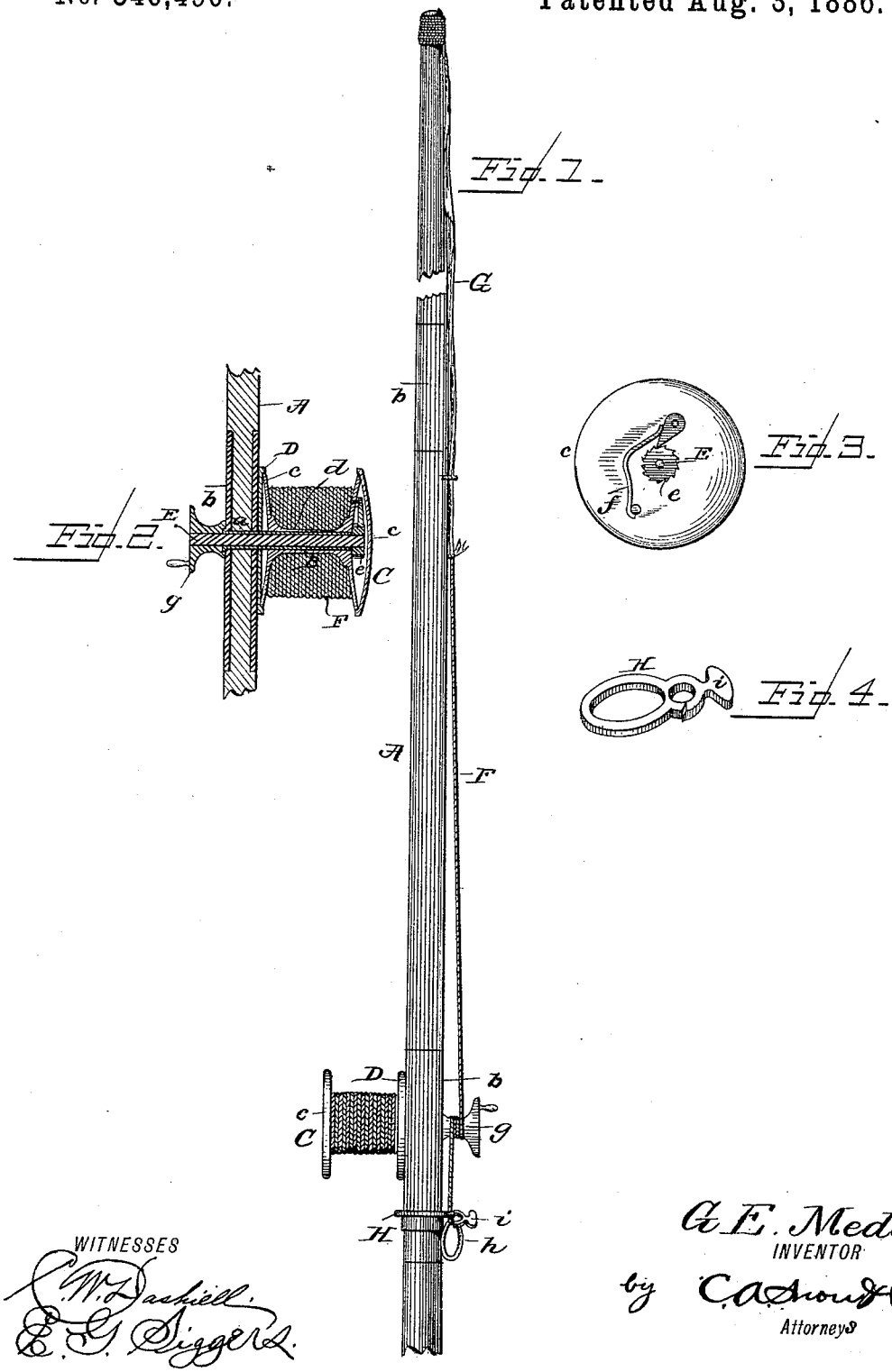
WITNESSES
G. E. Medley
INVENTOR
Attorneys

UNITED STATES PATENT OFFICE.

GRANVILLE E. MEDLEY, OF HOPKINSVILLE, KENTUCKY.

FISHING-REEL.

SPECIFICATION forming part of Letters Patent No. 346,490, dated August 3, 1886.

Application filed January 29, 1885. Serial No. 154,325. (No model.)

*To all whom it may concern:*

Be it known that I, GRANVILLE E. MEDLEY, a citizen of the United States, residing at Hopkinsville, in the county of Christian and State of Kentucky, have invented a new and useful Fishing-Reel, of which the following is a specification, reference being had to the accompanying drawings.

My invention relates to fishing-reels; and it has for its object to provide improved devices for winding the line.

A further object of the invention is to provide a fishing-reel which shall be cheap and simple in its construction, effective in its operation, and one by the use of which the line may be wound or reeled in the minimum amount of time.

The invention consists in the improved construction and combination of parts hereinafter fully described, and pointed out in the claims.

In the drawings, Figure 1 is an elevation of a sufficient portion of a fishing-rod to illustrate the application of my invention. Fig. 2 is a longitudinal vertical section of the reel detached from the pole. Fig. 3 is a side elevation showing the pawl on the reel and the ratchet-wheel on the spindle, and Fig. 4 is a detail view of the guide for the spring-actuated cord or band.

In the accompanying drawings, in which like letters of reference indicate corresponding parts in all the figures, A represents the pole, which in this case is jointed. A transverse hole or opening, $a$, is made through said pole at any suitable point thereon, in this case it passing through one of the metal joints $b$ used for connecting the sections of the said rod or pole. Fitting in the hole or opening and extending beyond the side of the rod or pole at one end is a tube or bushing, B, upon the outer end of which is mounted a reel, C. The said reel C consists of the side plates, $c$, connected by a tubular sleeve, $d$, which is preferably formed integral with said side plates, which form guards for holding the line in place upon the said sleeve when wound thereon, and for guiding it to said sleeve while being wound. Upon the tube or bushing B, between the side of the rod or pole and the inner side of the reel, is mounted a disk or plate, D, having its edge turned outwardly to form a flange, which flange serves as a guard for the inner plate of the reel.

E represents a shaft or spindle, one end of which extends a sufficient distance beyond the reel to allow of a ratchet-wheel, $e$, being placed thereon, said ratchet-wheel being engaged by a pawl pivoted to the outer side of the reel, and held in place by a flat spring, $f$, bearing upon the upper side thereof. The other end of the shaft or spindle extends beyond the side of the pole, and mounted on said extended end is a flanged spool, $g$, said spool being rigid upon the said spindle, and having its outer flange of greater diameter than its inner flange, to prevent the accidental detachment of the spring-actuated cord for winding the reel. Said spool is also provided on its outer flange, near the edge thereof, with an outwardly-extending handle.

F represents a cord, which is adapted to be wound upon the spool one or more times, and when pulled will turn said spool and reel to wind the cord. For returning said cord in order that it may be again pulled to cause the spool and reel to revolve, I employ a spring, G, which in this case is constructed of rubber, attached to the rod or pole at its upper end and to the cord F at its lower end. A spiral might be employed, if desired, and accomplish the same result, but by the use of a rubber spring the same is caused to lie flat upon the pole, is soft, therefore does not scratch the same, is inexpensive, and when broken may be readily substituted by another at a slight cost. At the lower end of the cord F is attached a finger-ring, $h$, while upon the rod or pole just below the reel is provided a guide, H, having a hole or opening for the passage of the cord F, and a slot communicating with said opening, so that the cord may be readily inserted therein without removing the ring from said cord, as would necessarily be the case were said slot not provided. Extending outwardly from said guide H is a hook, $i$, upon which the ring may be attached when the cord is removed from the spool.

The operation is as follows: Supposing the line to be unwound, the cord F is wrapped one or more times around the spool and passed through the opening in the guide H. By pulling the cord downwardly the same by friction turns the spool, which is rigidly mounted on the spindle or shaft. The pinion on the end of said shaft engages with the pawl of the reel, thus causing said reel to be revolved, one pull causing said reel to be revolved a good many times. The force of the rubber spring serves to draw the cord back when pressure or strain upon the same is released, but said cord should not be released as the force of the spring would draw the same back, and would be likely to break the same. The cord in its backward movement turns the spool and spindle or shaft, but the reel remains stationary, from the fact that the pawl slides upon the ratchet of spindle and does not engage the teeth of the same. When it is desired to unwind the line, the cord F is removed from the spool, thus allowing the reel to be turned backward freely and easily and the line unwound. To set an alarm, the line may be unreeled, and then a few yards of the same wound backward on the reel, so that when the line is moved it will unwind the line that is wound back on the reel and turn the same, which will cause the ratchet to engage the pawl, and thus make a noise sufficient to attract the attention of the user, who for the time being might be otherwise occupied. As soon as the line that had been wound backward on the reel has been unwound, the line will be prevented from unwinding any further, the cord F serving as a stop or brake. The outer side of the reel, or more properly the outside plate, is provided with a disk or plate which incloses the pawl and ratchet, and protects the same from dust and dirt.

Having fully described my invention, what I claim as new, and desire to secure by Letters Patent, is—

1. The combination, with a fishing-reel and a spool connecting therewith, of a cord or band wrapped around the spool, an elastic secured to the pole and connecting with one end of the cord or band, whereby when the free end of the cord or band is pulled it is unwound from the spool, causing the reel to revolve, as set forth.

2. The combination of a fishing-reel and a spool connecting therewith, and a spring-actuated cord or band wrapped around the spool, whereby when the free end of the cord or band is pulled the reel is revolved, and means, substantially as described, for locking the free end of said cord or band, as set forth.

3. The combination, with a fishing-reel and a spool connecting therewith, and a spring-actuated cord or band wrapped around the spool and having its free operating end projecting therefrom, of a ring or hook on the free end of the cord or band, and locking means for the ring or hook to hold it to the pole, as set forth.

4. The pole, in combination with a suitably-journaled reel located on one side of the pole, a spool arranged on the opposite side of the pole and connecting with the reel, substantially as described, a cord or band wrapped around the spool, and an elastic secured rigidly to the pole and connecting with one end of the cord or band, as set forth.

5. The pole, in combination with the reel loosely journaled on a tube projecting from the pole, a shaft passing through the tube and pole, a spool mounted on one end of the shaft, a pawl-and-ratchet connection with the reel on the said shaft, a shield for covering the pawl-and-ratchet connection, and a cord or strap wrapped around the spool for winding the reel, as set forth.

6. The combination, with a pole, of a suitably-journaled reel and a spool connected therewith, a spring-actuated cord or band for winding the line, and a guide for said cord, said guide having a hole or opening for the passage of the cord, a slot communicating with said opening, and a hook, for the purpose set forth.

In testimony that I claim the foregoing as my own I have hereto affixed my signature in presence of two witnesses.

GRANVILLE E. MEDLEY.

Witnesses:
PALMER GRAVES,
JNO. P. CAMPBELL, Jr.